United States Patent [19]

Krenzel

[11] Patent Number: 4,703,519
[45] Date of Patent: Oct. 27, 1987

[54] SEWN POLYOLEFIN AND FABRIC BAG AND METHOD OF MAKING BAG

[76] Inventor: Ronald L. Krenzel, 940 Poplar, Boulder, Colo. 80302

[21] Appl. No.: 816,554

[22] Filed: Jan. 6, 1986

[51] Int. Cl.⁴ .................. A45C 5/02; A45C 11/38; B21D 51/52; B29C 45/00
[52] U.S. Cl. .................................... 383/97; 383/6; 383/105; 29/463; 112/262.1; 112/265.2; 150/52 J; 190/115; 190/119; 190/903; 206/316; 206/317; 206/521; 206/810; 264/500; 264/523; 264/547; 264/571
[58] Field of Search .............. 383/105, 97; 190/28, 190/100, 115, 119, 903, 114; 220/339, 334; 206/315.2, 315.5, 315.11, 316, 317, 587, 810, 523, 521; 150/52 A, 52 J, 52 G, 52 R; 112/262.1, 265.2; 29/463; 229/44 R; 264/500, 523, 544, 547, 571; 16/225

[56] References Cited

U.S. PATENT DOCUMENTS

| | | | |
|---|---|---|---|
| 1,839,779 | 1/1932 | Snyder et al. | 229/44 R |
| 2,344,861 | 3/1944 | Fowler | 206/810 X |
| 2,531,550 | 11/1950 | Bradley et al. | 206/317 |
| 2,661,823 | 12/1953 | Goetz | 190/24 |
| 2,746,582 | 5/1956 | Cart | 190/115 |
| 3,006,302 | 10/1961 | McNamara | 112/265.2 |
| 3,084,771 | 4/1963 | Davis | 190/119 X |
| 3,092,225 | 6/1963 | Kiuett | 150/52 A X |
| 3,132,909 | 5/1964 | Josefson | 206/587 X |
| 3,141,536 | 7/1964 | Fulton | 190/903 |
| 3,256,975 | 6/1966 | Puente | 206/587 X |
| 3,292,749 | 12/1966 | Reading | 190/119 |
| 3,443,671 | 5/1969 | Dyke | 190/103 |
| 3,468,274 | 9/1969 | Koffler | 112/262.1 |
| 3,530,919 | 9/1970 | May | 206/315.5 X |
| 3,576,271 | 4/1971 | Seeley | 229/44 R X |
| 3,596,822 | 8/1971 | Holley | 220/339 X |
| 3,865,166 | 2/1975 | Pedro | 150/52 R |
| 4,040,518 | 8/1977 | Carter | 220/339 X |
| 4,071,066 | 1/1978 | Schaeffer | 150/52 J |
| 4,180,112 | 12/1979 | Bouet | 383/4 |
| 4,337,853 | 7/1982 | Davis | 190/125 |

FOREIGN PATENT DOCUMENTS 2658454 6/1978 Fed. Rep. of Germany ........ 190/28

OTHER PUBLICATIONS

"Polyethylenes", by P. H. Estes, Machine Design—Plastics Reference Issue, 6/16/66, Chapter 21, Pub. by Penton Pub. Co.
"Polypropylenes", by R. F. Jones, Machine Design—Plastics Reference Issue, 6/16/66, Chapter 24, Pub. by Penton Pub. Co.

Primary Examiner—William Price
Assistant Examiner—Sue A. Weaver

[57] ABSTRACT

A sewn polyolefin in fabric bag which uses the molded shapes of the polyolefin material to form a shaped enclosure. Enclosure means and a fabric hinge are sewn directly to the polyolefin enclosure means to form the completed bag. The bags formed in this manner have many of the advantages of both soft and hard shelled bags. The polyolefin material is capable of providing a predetermined shape but has a soft exterior surface and is deformable. Sewing can be done using conventional sewing techniques. Polyolefin materials have not previously been usable in this manner because of their inability to bond or weld in reliable manner to other materials.

24 Claims, 10 Drawing Figures

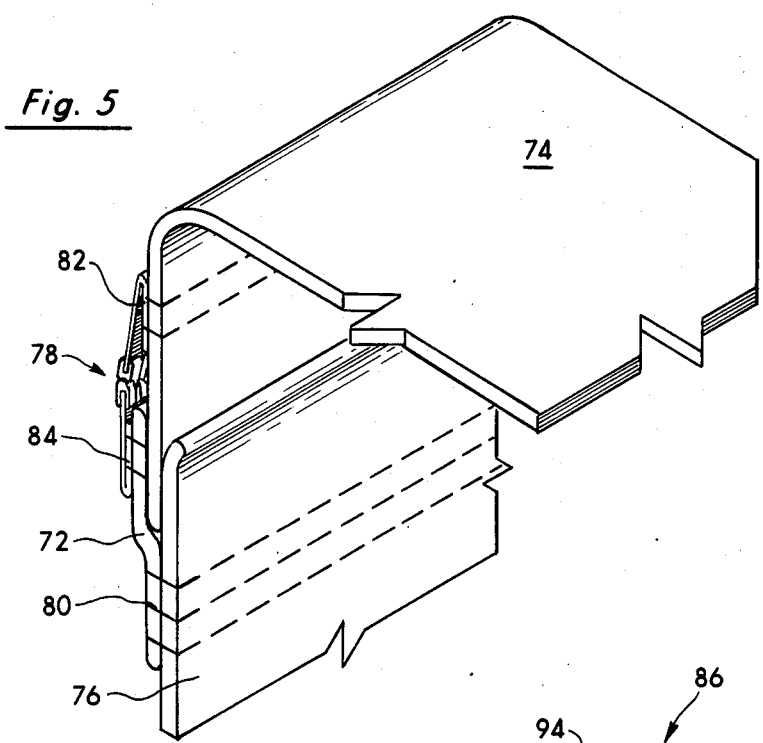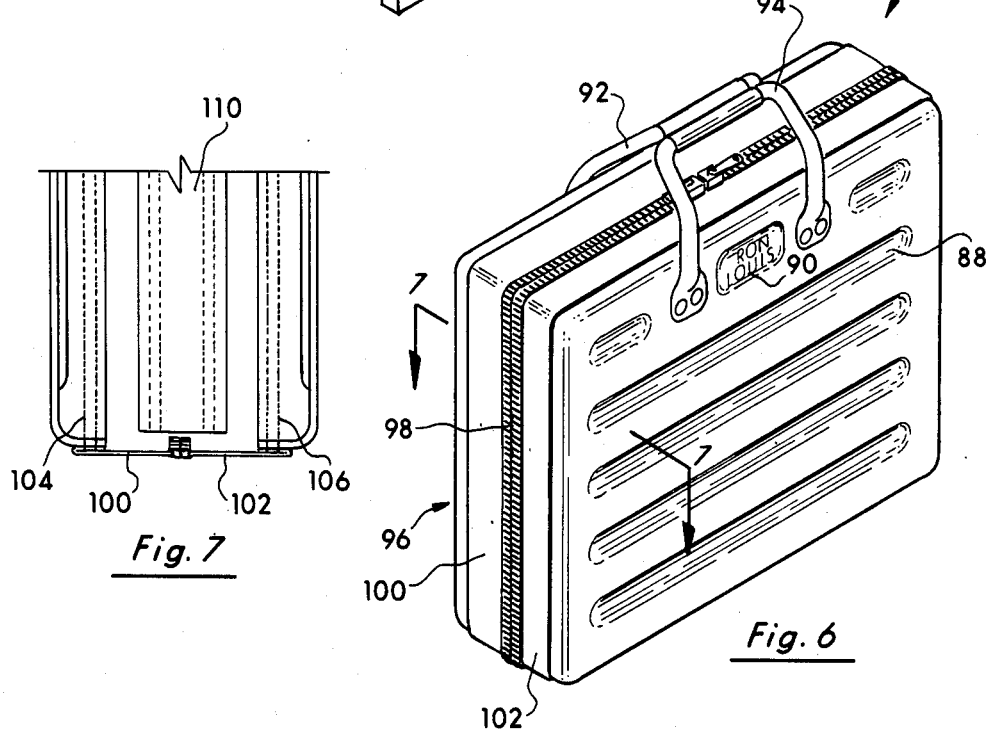

SEWN POLYOLEFIN AND FABRIC BAG AND METHOD OF MAKING BAG

BAKCGROUND OF THE INVENTION

1. Field of Invention

The present invention pertains generally to bags and luggage and more particularly to plastic bags.

2. Discussion of the Background

The basic concept of the use plastic in luggage and bags has been known for some time. For example, the following patents are examples of bags and luggage which use plastic as a construction material.

| U.S. Pat. No. | Inventor Name | Issue Date |
|---|---|---|
| 2,219,524 | Lindley et al. | Oct. 29, 1940 |
| 2,661,823 | Goetz | Dec. 8, 1953 |
| 3,141,536 | Fulton | Jul. 21, 1964 |
| 3,443,671 | Dyke | May 13, 1969 |
| 4,180,112 | Bovet | Dec. 25, 1979 |
| 4,337,853 | Davis | Jul. 6, 1982 |

Rigid bags and semi-rigid bags are considerably more convenient to users than soft bags since rigid bags and semi-rigid bags are easier to pack and allow better organization of the packed bag so that items can be easily found by the user. Additionally, rigid bags can be formed to hold specified items in predetermined locations within the bag to provide even better organization. Additionally, hard bags provide a considerable amount of protection to items carried within the bag.

Soft bags, on the other hand, are more comfortable to carry and are less likely to cause damage to other items such as upholstery in cars, woodwork, etc. Additionally, soft bags can be easily packed into tight places such as lockers and trunks because of their ability to deform to surrounding shapes. Also, soft bags are less susceptible to self damage, as a result of being dropped or impacted in any other manner, due to their deformable nature. Consequently, it is desirable to have a bag which incorporates many of the features of both the soft and hard shell bags.

A primary advantage of using plastic in bags is to reduce overall costs. Materials such as ABS which has been conventionally used in plastic bags can be attached by gluing and welding techniques to form a desired shape. However, ABS tends to absorb moisture so that the humidity within the bag increases. Additionally, ABS is generally a hard, brittle material which must be used in relatively large thicknesses in luggage to prevent cracking and breaking of the material. This does not allow construction of a soft shell bag from ABS and increases the overall weight of the bag. Lighter weight materials which are softer and allow greater deformation, such as polyethylene, polypropylene, i.e. polyolefins, and similar materials, generally cannot be either glued or welded to form a desired bond.

Although the prior art discloses a number of sewn plastic bags, as set forth in the above references, none of the references disclose bags formed from plastic molded into a predetermined shape. As set forth above, the primary advantage of using plastic in a bag is to reduce overall costs. The references cited above fail to disclose the use of plastic molded into a predetermined shape to form a bag enclosure. Rather, each of the references uses an adjacent piece of plastic or fabric material sewn in a predetermined angular relationship to form the desired shape. This necessarily requires additional sewing and additional labor cost which necessarily increases the overall cost of manufacturing the bag. Plastic which can be molded into the desired shape provides a great reduction in costs over prior arts devices, such as disclosed in above referenced patents. Moreover, the prior art in general fails to show the use of a molded plastic to form a bag structure which is semi-rigid but still deformable. None of the plastic bags of the prior art have a deformable space to provide a shock protection for items carried within the bag.

SUMMARY OF THE INVENTION

The present invention overcomes the disadvantages and limitations of the prior art by providing a bag which is formed from a polyolefin material, such as polyethylene or polypropylene, which is molded into a predetermined shape and which is deformable to provide a soft exterior surface. The present invention utilizes rib structures to provide structural support to maintain the shape of the bag and provide shock protection to the contents of the bag by providing a space between the outer surface of the bag and the interior contents. The shape of the bag is formed by the molded structure of the plastic to eliminate additional costs in stitching in prior art bags to form the shape of the bag. Stitching is used to couple the enclosure device, such as a zipper, and a hinge to allow the bag to be opened and closed. An interior surface can be molded into the plastic portions which are specifically adapted to hold specified items such as tape cassettes, camera equipment, guns and other similar items in specified locations within the bag and which are recessed from the outer surface portions to provide further shock protection. In this manner, the present invention incorporates the safety features of protection provided by of a hard shell bag together with the advantages of deformability and a soft surface of soft bags.

The present invention may therefore comprise a hand-held bag capable of substantially maintaining a predetermined shape while transporting specified items and deformable to provide a soft exterior surface comprising polyolefin enclosure thermoformed to produce said predetermined shape, the polyolefin enclosure having a thickness and density sufficient to maintain the predetermined shape and allow the polyolefin enclosure to be sewn with thread, a fabric hinge sewn with the thread to the polyolefin enclosure to couple individual portions of the polyolefin enclosure and to allow movement between the individual portions, a closure having fabric portions sewn to the polyolefin enclosure for releasably joining the individual portions of the polyolefin enclosure in the predetermined shape.

The present invention may also comprise a method of forming a hand-held bag capable of substantially maintaining a predetermined shape and providing shock protection for items carried in the bag comprising the steps of thermoforming polyolefin material into enclosure portions having a predetermined shape, sewing a fabric hinge to the enclosure portions to couple the enclosure portions and to allow movement between the enclosure portions, sewing fabric closure means to the enclosure portions of the polyethylene material to allow the enclosure portions of the polyolefin material to be releasably connected.

BRIEF DESCRIPTION OF THE DRAWING

FIG. 5 is an isometric view showing the manner in which a connector is sewn to the enclosure means of the present invention.

FIG. 6 is a schematic isometric view illustrating the implementation of the present invention as a briefcase.

FIG. 7 is a cross-sectional view of the briefcase of FIG. 6.

DETAILED DESCRIPTION OF THE INVENTION

Figure 1:
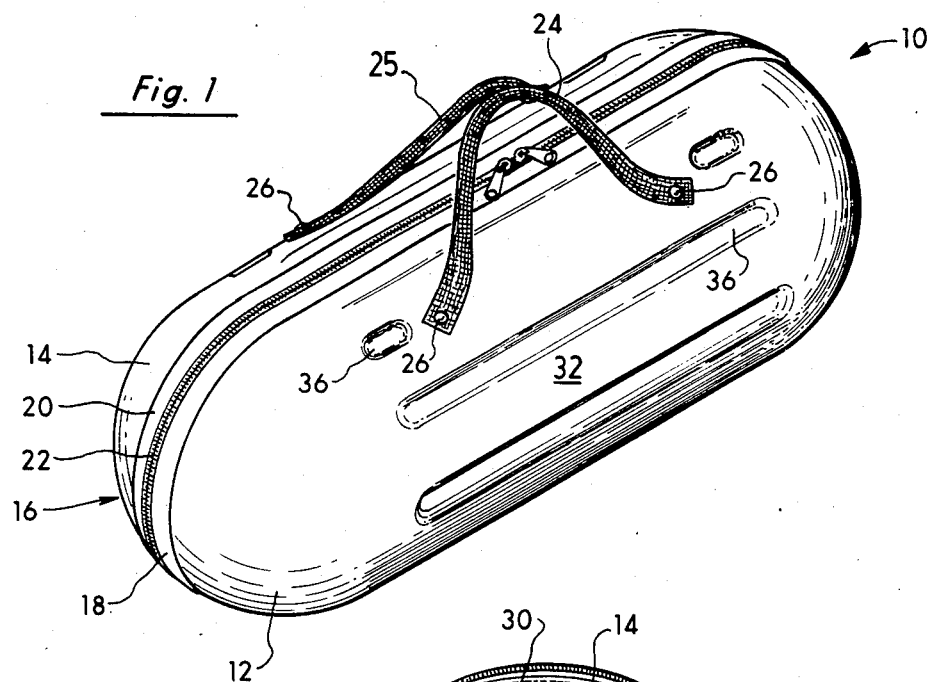
FIG. 1 is a schematic isometric view of a closed bag comprising one embodiment of the present invention.

FIG. 1 comprises a schematic isometric view of the present invention implemented as a hand-held carrying bag. The bag of FIG. 1 is shown in a closed condition and can be used as luggage, a gym bag, an all purpose bag, etc. Bag 10 comprises enclosure portions 12, 14 which are joined together by closure means 16 which includes fabric portions 18, 20 sewn directly to enclosure portions 12, 14, and zipper means 22 which are attached to fabric means 18, 20. Handle means 24, 25 comprise fabric handles which are riveted to enclosure means 12, 14 by way of rivets 26.

Enclosure means 12, 14 comprises a polyolefin material which is thermoformed to the predetermined shape illustrated in FIG. 1 or any desired shape. The polyolefin material has a thickness and density sufficient to maintain the predetermined shape while simultaneously allowing fabric material to be sewn to the polyolefin material using a conventional sewing machine. The polyolefin material can comprise either polyethylene or polypropylene. Both of these materials have hydrophobic and non-desiccant properties. The preferred thicknesses of the polyolefin material range from approximately 0.010 inches to approximately 0.20 inches. The preferred density of these materials is in the range of approximately 0.84 to approximately 0.98 specific gravity. This range of thicknesses and densities allows the enclosure means to be fabricated so that enclosure means maintains a predetermined shape and can be sewn with standard thread using conventional sewing machines to a fabric material. The fabric material can comprise standard nylon having 200 to 1050 denier. Zipper means 22 can comprise either a coiled or molded zipper. The thread used to sew the fabric material 18, 20 to enclose means 12, 14, respectively, can comprise either nylon, textile or combinations of synthetic and natural materials such as cotton and polyester core thread.

The polyolefin material can be colored in any desired color or shading to provide a decorative appearance to the bag. Polyolefins such as polyethylene and polypropylene have high thermal stability and polypropylene has very high chemical resistance and heat deflection properties. As set forth above, stitchability of the polyolefin material is maintained by insuring that the material is not too brittle and not too thick to sew using conventional sewing machines. This is accomplished, as set forth above, by maintaining the approximate density within the range set forth above and the thicknesses within the approximate thicknesses of the ranges set forth above. Of course, use of polyolefins outside of the approximate ranges, as set forth above, is certainly included within the purview of the present invention. Polyolefin materials such as polyethylene and polypropylene which are used in accordance with the present invention, can be obtained from Atlas Plastics Corporation, Cape Girardeau, Mo.

The molding process used in the present invention comprises thermoforming which includes vacuum molding, injection molding and blow molding. Conventional vacuum molding techniques can be used to form the molded enclosure means 12, 14. For example, polyolefin material can be obtained in roll sheets which are passed through a oven to bring the polyolefin material to the desired temperature level for molding. The roll sheet material is then transported to a forming station having a refrigerated cast aluminum mold or fabricated aluminum mold which move into position to mold the heated sheet material into the enclosure shapes 12, 14, as illustrated in FIG. 1. Vacuum and pressure are applied to the aluminum molds through small holes in the mold to ensure that the polyolefin material adheres to the shape of the mold. The molded plastic pieces are then ejected from the mold and the next portion of the heated sheet material is moved to the proper position for molding. These methods of vacuum molding are well known in the industry. Other methods of forming enclosure means 12, 14 include conventional injection molding techniques and blow molding techniques using a parison. These techniques are also well known in the industry.

Figure 2:
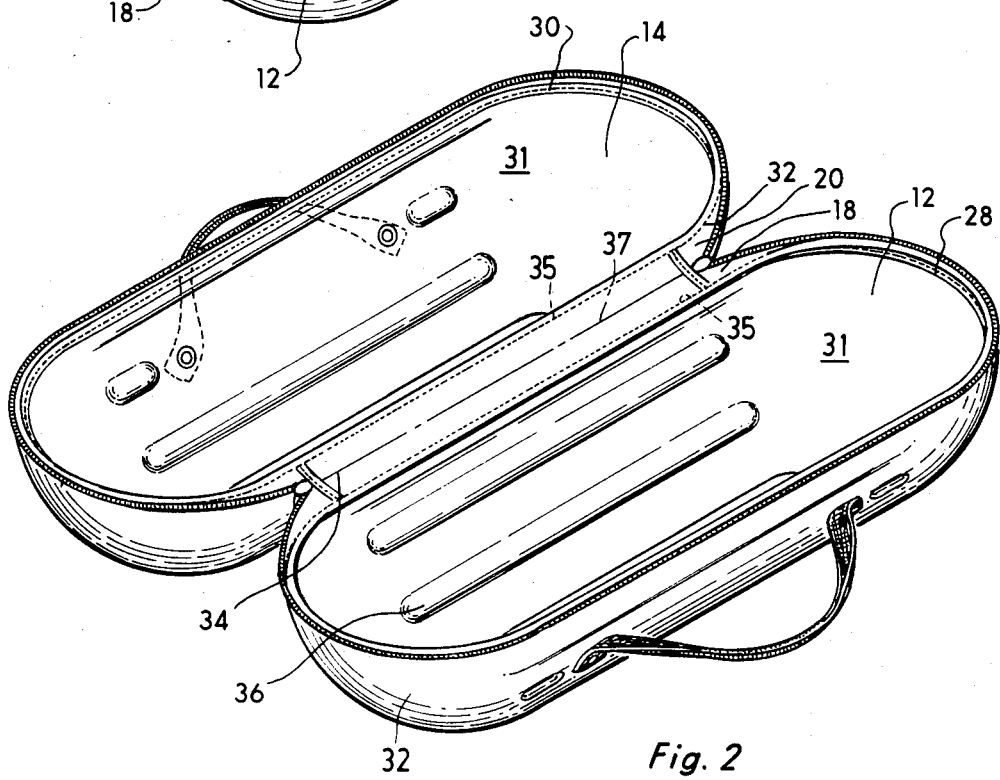
FIG. 2 is a schematic isometric view of the bag in FIG. 1 as shown in open position.

FIG. 2 is a schematic isometric view illustrating the bag of FIG. 1 in an opened orientation. Stitching 28, 30 can be readily observed on interior portions of enclosure means 12, 14. Stitch lines do not appear on the outer surfaces of fabric 18, 20, as illustrated in FIG. 1, since the material is folded over, as shown in FIG. 2, and stitched from an outer surface 32. FIG. 2 also illustrates a fabric hinge means 34 which is stitched directly to both enclosure means 12, 14 and fabric portions 18, 20. The fabric hinge 34 can also form an integral part of the fabric portions 18, 20, or the closure mean 16 (FIG. 1) can comprise a hinge. Fabric portion 34 is arranged to couple the individual portions 12, 14 of the polyolefin enclosure means and allow movement between the individual portions 12, 14 so that the bag 10 can be opened and closed.

As best seen in FIG. 2, the fabric hinge is essentially made of a strip of fabric 34 having opposing edge portions 35 extending on each side along the longitudintal axis 37. Each of the individual enclosure portions 12, 14 has an interior surface 31 and an exterior surface 32 and as shown, the fabric strip 34 is positioned and sewn with the opposing edge portions 35 thereof repectively adjacent the interior surfaces 31 of each individual portion 12, 14. In this manner and in the closed position of FIG. 1, the exterior surfaces 32 of the individual portions 12, 14 face outwardly and the interior surfaces 31 face inwardly with the opposing edge portions 35 of the fabric strip 34 respectively adjacent the interior surfaces 31 and also facing inwardly of the bag 10. Closure means 16 can comprise a standard zipper, or a water proof zipper, for releasably joining the individual portions of the polyolefin enclosure means 12, 14 to form the shape of the bag 10 as illustrated in FIG. 1. Fabric portions 18, 20, as well as fabric hinge 34, can also comprise water proof material and the stitching can be sealed to provide a substantially water proof bag. Because of the hydrophobic and non-desiccant properties of the polyolefin material, items can be stored in the bag without exposure to high moisture content. Rib means 36, illustrated in both FIGS. 1 and 2, comprise depressed portions extending inwardly of the interior surfaces 31 of the individual portions 12, 14 which function to maintain the predetermined shape of the bag as illustrated. The rib means 36 provides structural rigidity and shock protection to the specified items carried within the bag. Items carried in the bag are spaced by the distance of the depressed portions of rib means 36 from the interior surfaces 31 of the enclosure means. Consequently, the interior surfaces 31 can be depressed by a predetermined amount prior to impinging upon the items carried within the bag. The polyolefin material is soft and easily deflected so that a high degree of shock protection is provided.

Assembly of the bags can be performed by two different methods. In accordance with the first method, the zipper means, including its associated fabric portion, can be sewn to each individual enclosure means. For example, fabric portion 18 can be sewn to enclosure means 12, while fabric portion 20 can be sewn directly to enclosure means 14 prior to assembly of the two individual portions. By attaching the zipper skidders, the bags can then be joined together. The zipper ends are then secured to prevent the zipper skidders from being displaced from the zipper coil to complete the fabrication. If a separate hinge means 34 is required, the hinge means 34 is then sewn to the separate individual enclosure means to complete the bag.

According to the second method, the zipper and fabric are sewn together in what is referred to as a boxing. The boxing is then sewn to each of the molded enclosure means 12, 14 to complete the enclosure.

Figure 3:
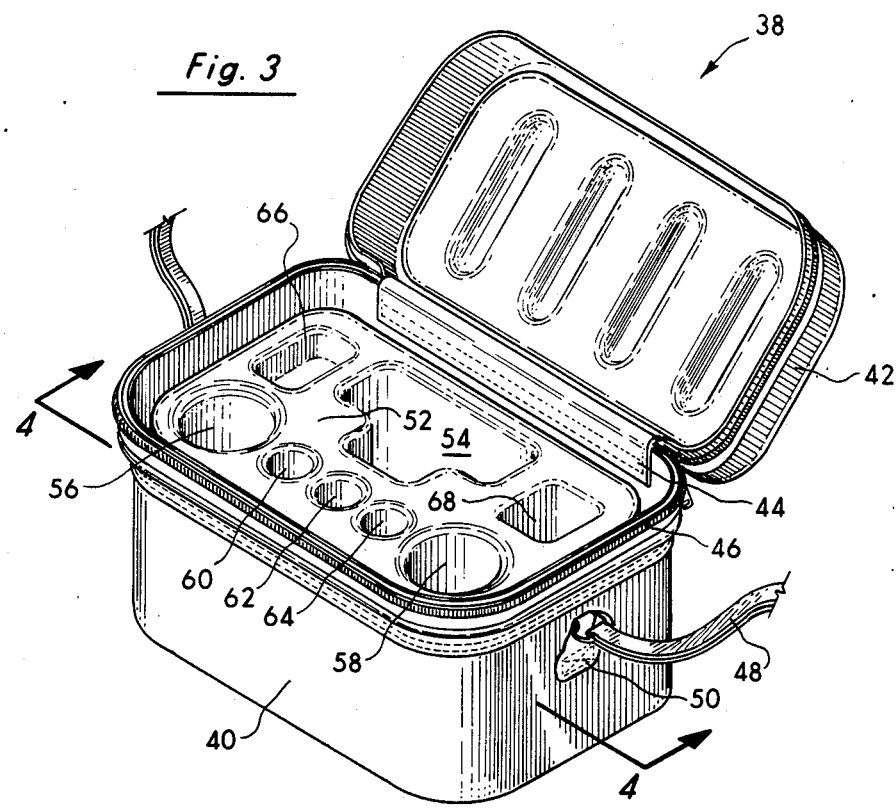
FIG. 3 is a schematic isometric view of the bag of the present invention implemented as a camera bag.

FIG. 3 is a schematic isometric view of the present invention implemented as a camera bag 38. As illustrated in FIG. 3, the camera bag can be formed to molded portions 40, 42 which are attached by fabric hinge 44 and a closure means 46 which comprises a zipper. Hinge means 44 and closure means 46 are attached by sewing to the molded portions 40, 42, as described above. Carrying strap 48 is attached to molded portion 40 by stitching 50, as illustrated in FIG. 3. Camera bag 38 includes interior structure means 52 which is formed from molded plastic portion 40 and specifically adapted to hold camera items such as a camera casing, lenses and film in a shape which is specifically adapted for these items. For example, recessed portions 54 are specifically adapted to hold a camera casing while recessed portions 56, 58 are specifically adapted to hold camera lenses. Openings 60, 62, 64 are adapted to hold film cartridges. Openings 66, 68 are adapted to hold other desired items such as lens filters, etc.

Figure 4:
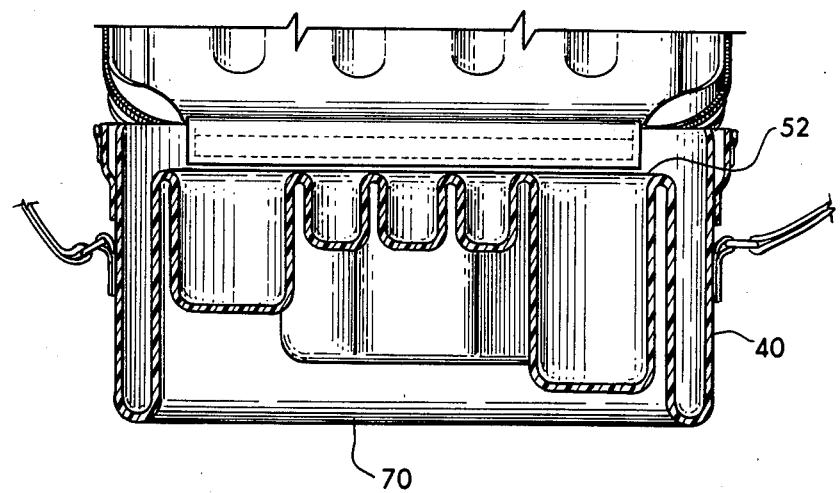
FIG. 4 is a cross-sectional view of the camera bag of FIG. 3.

FIG. 4 comprises a cross-sectional view of the camera bag illustrated in FIG. 3. As illustrated in FIG. 4, the interior structure 52 forms part of the single molded structure 40 comprising the outer surface portion of the camera bag 38. The single, integrally molded structure 40 forms the interior structure 52 which is spaced from the sides of the outer surface of the camera bag where the strap is attached and from the bottom of the bag 70 to allow a predetermined amount of deflection prior to impinging any of the items carried within the interior structure 52. In this manner, shock protection is provided for the items carried within the interior structure 52. Of course, the thickness and density of the material can be varied to vary the shock protection provided by the bag. For example, the thickness and density can be varied to vary the transmission of either high frequency or low frequency shock waves and thereby allow the bag to be custom designed to particular use. For example, in implementing the bag as a camera bag 38, it is probably most advantageous to limit the transmission of higher frequency shock waves to protect the optical and mechanical portions of the camera equipment. Consequently, a less dense material of greater thickness may be desirable for this type of implementation. Additionally, the spacing can also be varied to change the amount of shock protection provided by the bag.

FIG. 5 is a schematic isometric view illustrating the manner in which the connector means 72 functions in accordance with the present invention. Molded enclosure means 74, 76 form two individual portions of a bag which is joined together by enclosure means 78. Connector means 72 is stitched directly to molded enclosure means 76 by way of stitching 80. Connector means 72 has a curved shape to provide an opening and an abutment which limits the travel of molded enclosure means 74. Enclosure means 78 is stitched directly to molded enclosure means 74 by way of stitching 82 and connector means 72 by way of stitching 84. By limiting the travel of molded enclousre means 74, 76 by connector means 72, strain relief is provided for enclosure means 78. Of course, molded enclosure means 76 could be made in a curved shape rather than connector means 72 to provide an opening and an abutment.

FIG. 6 is a schematic isometric view of the present invention implemented as a brief case or an all purpose carrying bag 86. The bag includes rib means 88, name plate 90 carrying handles 92, 94, which can be formed from either fabric or plastic, and enclosure means 96, which can comprise a zipper 98 connected to fabric portions 100, 102. As illustrated in FIG. 6, fabric portions 100, 102 are wide so that the bag is expandable along its width.

FIG. 7 comprises a cross-sectional view illustrating the manner in which the fabric portions 100, 102 are stitched by way of stitching 104, 106 to the enclosure means. FIG. 7 also illustrates plastic portion 110 which can be inserted along the bottom of the device to maintain a predetermined width.

Figure 8:
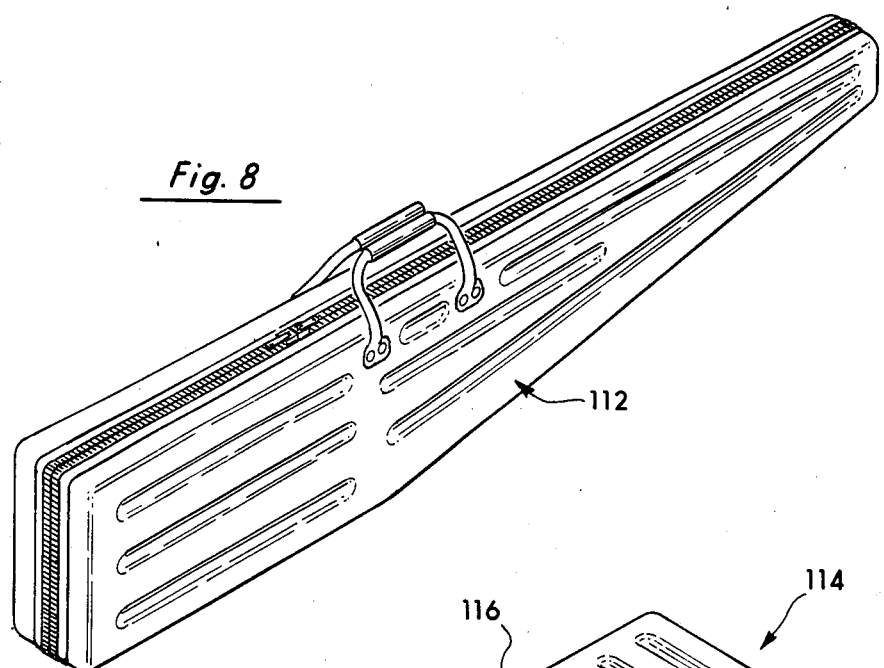
FIG. 8 is a schematic isometric view illustrating implementation of the present invention as a gun case.

FIG. 8 is a schematic isometric view of the present invention implemented as a gun case 112. The gun case 112 is fabricated in the same manner as described above, but in a design to fit a rifle. The case has an advantage of being light weight, protective and can be made waterproof.

Figure 9:
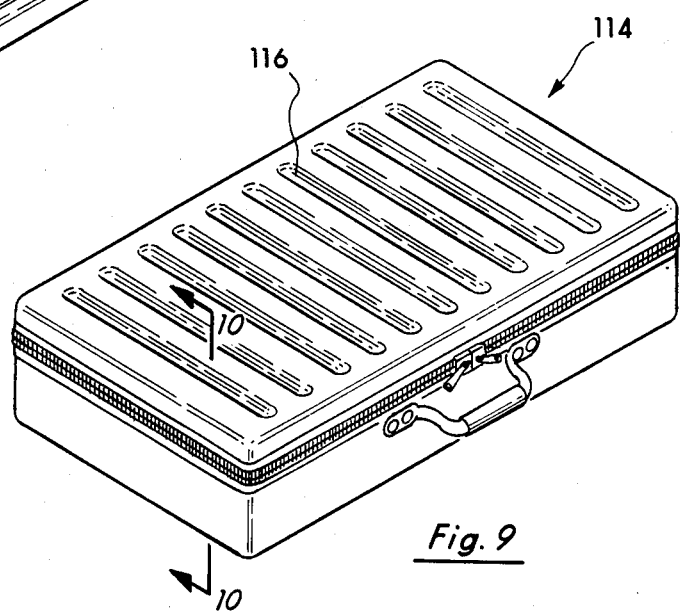
FIG. 9 is a schematic isometric view illustrating implementation of the present invention as a cassette tape carrier.
Figure 10:
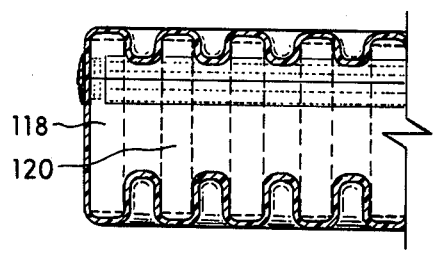
FIG. 10 is cross-sectional view of FIG. 9 illustrating the manner in which cassette tapes are held within the cassette tape carrier.

FIG. 9 is a schematic isometric view of the present invention implemented as a cassette tape carrying case 114. Cassette carrying case 114 is constructed in the same manner as described above but utilizes rib portions 116 which are spaced to hold cassette tapes within the interior structure of the bag 114. The manner in which the rib portions 116 hold the cassette tapes is more clearly illustrated in FIG. 10, which is a cross sectional view of FIG. 9. As illustrated in FIG. 10, cassette tapes such as cassette tapes 118, 120 fit between the ribbed portions and are held tightly by the interior structure of the case. This holds the cassette tapes in an organized manner and provides shock protection.

Consequently, the present invention provides a bag which incorporates the advantages of both soft bags and hard shelled bags. The bag of the present invention has a soft exterior surface and is deformable, but is capable of maintaining a predetermined shape. The bag also provides shock protection to specified items carried within the bag and can be specifically designed with an interior structure to hold items in predetermined locations. The bag of the present invention can be easily manufactured using conventional sewing techniques to attach fabric hinges and fabric enclosure devices. The bag is light weight and color can be easily added to the polyolefin material to produce a decorative appearance. Polyolefin materials have not previously been used to make bags and other similar enclosures because of the inability to bond to the material. The present invention overcomes these problems and takes advantage of the qualities of polyolefins, such as the soft exterior surface, deformability, light weight, heat resistance, ability to repel water and the ability to maintain a predetermined shape, by attaching a closure device and hinge using conventional sewing techniques.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best describe the principles of the invention and its practical application to thereby enable others skilled in the art to best utilize the invention in various embodiments and various modifications as are suited to the particular use contemplated. It is intended that the appended claims be construed to include other alternative embodiments of the invention except in so far as limited by the prior art.

What is claimed is:

1. A hand held bag capable of substantially maintaining a predetermined shape while transporting specified items and deformable to provide a soft exterior surface comprising:
    polyolefin enclosure means thermoformed to produce said predetermined shape, said polyolefin enclosure means having at least two individual portions and a thickness and density sufficient to maintain said predetermined shape and allow said polyolefin enclosure means to be sewn with thread;
    fabric hinge means including a fabric strip having opposing edge portions extending along a longitudinal axis, each of said individual portions of said polyolefin enclosure means having interior and exterior surfaces, said fabric strip being positioned with said opposing edge portions respectively adjacent the interior surfaces of said individual portions and respectively sewn with said thread to the individual portions of said polyolefin enclosure means to couple said individual portions and to allow relative movement between said individual portions between opened and closed positions; and,
    closure means having fabric portions sewn to said polyolefin enclosure means for selectively joining said individual portions of said polyolefin enclosure means in said closed position with the exterior surfaces of said individual portions facing outwardly of said polyolefin enclosure means and the interior surfaces thereof facing inwardly and with the opposing edge portions of said fabric strip respectively adjacent the interior surfaces of said individual portions and facing inwardly of said polyolefin enclosure means.

2. The bag of claim 1 wherein said polyolefin enclosure means comprises polyethylene having a specific gravity in the range of 0.84 to 0.98.

3. The bag of claim 1 wherein said polyolefin enclosure means comprises polypropylene having specific gravity in the range of approximately 0.84 to 0.98.

4. The bag of claim 2 wherein said polyethylene enclosure means has a thickness in the range of approximately 0.010 inches to 0.200 inches.

5. The bag of claim 3 wherein said polypropylene enclosure means has a thickness in the range of approximately 0.010 inches to 0.200 inches.

6. The bag of claim 1 further comprising:
    rib means formed in said polyolefin enclosure means for providing structural rigidity to maintain said predetermined shape.

7. The bag of claim 1 wherein said polyolefin enclosure means comprises low density polyolefin and said bag further comprising:
    rib means extending inwardly of the interior surface of each individual portion of said polyolefin enclosure means for providing structural rigidity to maintain said predetermined shape and for providing shock protection to said specified items by producing space between the interior surfaces of said individual portions and said specified items to allow deformation of said low density polyolefin enclosure means while preventing impingement of said specified items.

8. The bag of claim 1 wherein said closure means comprises:
    zipper means sewn to said polyolefin enclosure means.

9. The bag of claim 8 wherein said zipper means comprises waterproof zipper means to provide a waterproof bag.

10. The bag of claim 1 wherein said polyolefin enclosure means comprises low density polyolefin and said bag further comprising:
    interior structure means integrally formed from at least one of said individual portions of said polyolefin enclosure means, said interior structure means specifically adapted to hold said specified items and being entirely and substantially recessed inwardly from outer surface portions of said low density polyolefin enclosure means to provide a substantial amount of shock resistance by providing a substantial amount of space between said interior structure holding said specified items and said outer surface portions.

11. The bag of claim 10 wherein said interior structure means is shaped to carry camera equipment.

12. The bag of claim 10 wherein said interior structure is shaped to carry cassette tapes.

13. The bag of claim 10 wherein said interior structure is shaped to carry guns.

14. The bag of claim 1 further comprising:
    connector means sewn to said polyolefin enclosure means to produce an abutment between said individual portions of said polyolefin enclosure means and for providing strain relief for said closure means.

15. The bag of claim 1 wherein said polyolefin enclosure means has hydrophobic and non-desiccant properties.

16. The bag of claim 1 further comprising:
fabric handle means riveted to said polyolefin enclosure means.

17. A method of forming a hand-held bag capable of substantially maintaining a predetermined shape and providing shock protection for items carried in said bag comprising the steps of:
thermoforming polyolefin material into at least two individual enclosure portions having predetermined shapes, each of said enclosure portions having interior and exterior surfaces,
providing fabric hinge means including a fabric strip having opposing edge portions extending along a longitudinal axis, positioning said fabric strip with said opposing edge portions respectively adjacent the interior surfaces of said enclosure portions, and respectively sewing said opposing edge portions of said fabric strip to said enclosure portions to couple said enclosure portions and to allow relative movement between said enclosure portions between opened and closed positions; and,
sewing fabric closure means to said enclosure portions of said polyolefin material to allow said enclosure portions to be selectively joined in said closed position with the exterior surfaces of said enclosure portions facing outwardly of said polyolefin enclosure means and the interior surfaces thereof facing inwardly and with the opposing edge portions of said fabric strip respectively adjacent the interior surfaces of said enclosure portions and facing inwardly of said polyolefin enclosure means.

18. The method of claim 17 wherein said polyolefin material is low density and said step of thermoforming comprises:
thermoforming said low density polyolefin to form rib means in said enclosure portions extending inwardly of the interior surface of each enclosure portion to provide structural rigidity to maintain said predetermined shape and to provide shock protection for said items carried in said bag by allowing a predetermined space between the interior surfaces of said enclosure portions and said items and preventing impingement of said items upon deformation of said enclosure portions.

19. The method of claim 17 wherein said polyolefin material is low density and said step of thermoforming comprises:
thermoforming said low density polyolefin to integrally form interior structure means from at least one of said enclosure portions, said interior structure means specifically adapted to hold said items and being entirely and substantially recessed inwardly from outer surface portions of said enclosure portions to allow a substantial amount of deformation of said outer surface portions of said enclosure portions without impinging upon said interior structure holding said items so as to provide a substantial amount of shock protection for said items.

20. The method of claim 17 wherein said step of thermoforming comprises blow molding said low density polyolefin material from a parison.

21. The method of claim 17 wherein said step of thermoforming comprises vacuum molding said low density polyolefin material.

22. The method of claim 17 wherein said step of thermoforming comprises injection molding said low density polyolefin material.

23. The method of claim 17 further comprising the step of:
attaching fabric handles to said enclosure portions.

24. The method of claim 17 further comprising the step of:
sewing connector means to said enclosure portions to produce an abutment capable of providing strain relief for said closure means.

* * * * *